UNITED STATES PATENT OFFICE.

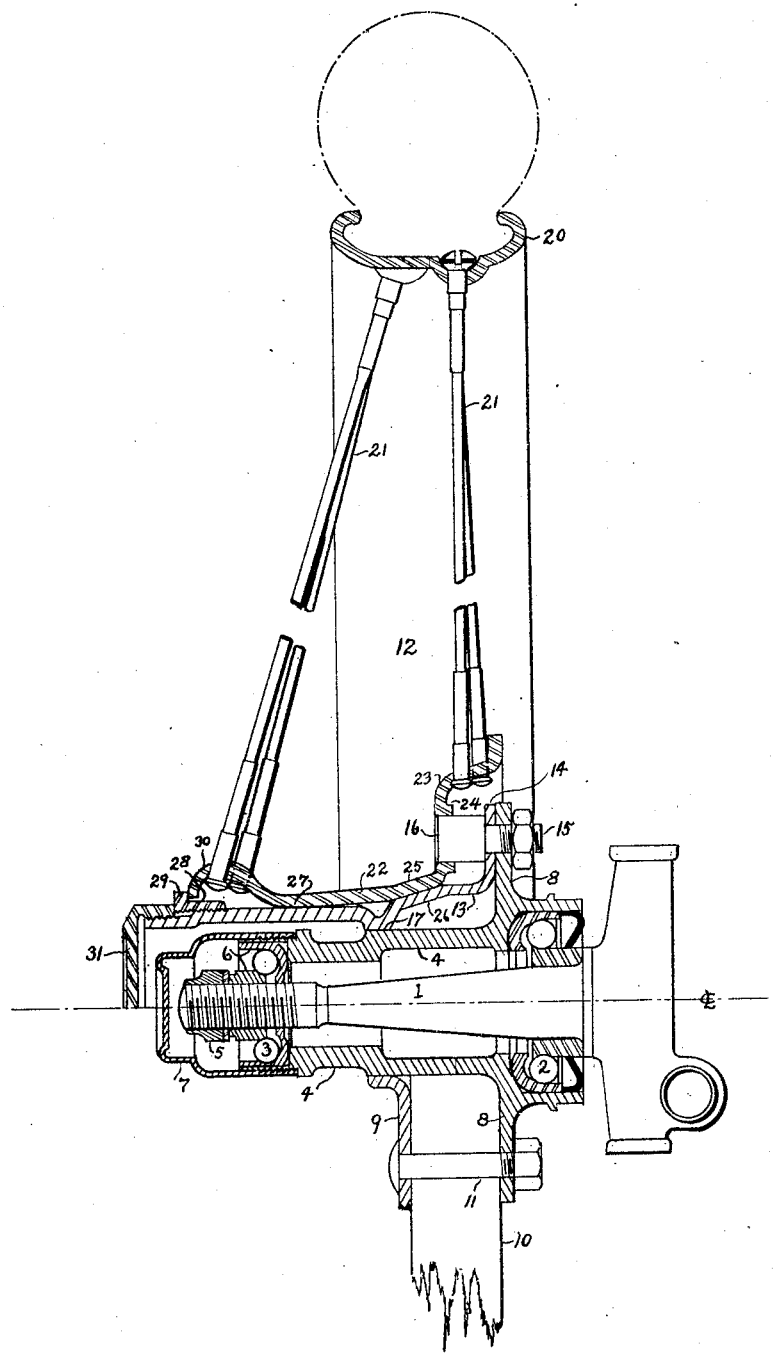

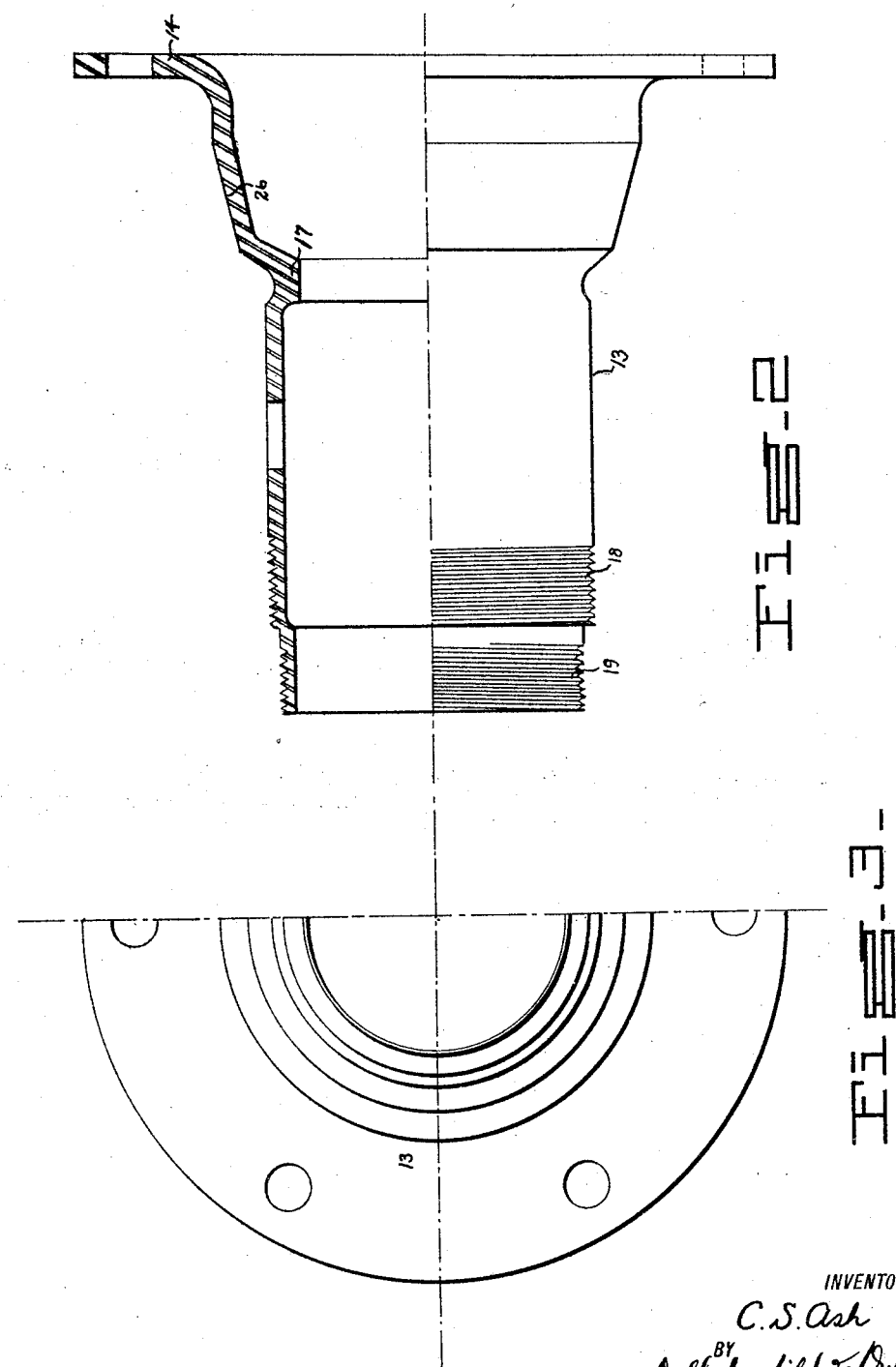

CHARLES S. ASH, OF GENEVA, NEW YORK.

QUICK-DETACHABLE VEHICLE WHEEL.

1,414,005.   Specification of Letters Patent.   Patented Apr. 25, 1922.

Application filed August 10, 1918. Serial No. 249,280.

*To all whom it may concern:*

Be it known that I, CHARLES S. ASH, a citizen of the United States, residing at Geneva, in the county of Ontario and State of New York, have invented certain new and useful Improvements in Quick-Detachable Vehicle Wheels, of which the following is a full, clear, and exact description, such as will enable others skilled in the art to which it appertains to make and use the same.

This invention relates to vehicle wheels, and more particularly to improvements in the construction and assembly of parts thereof whereby quick detachable wheels, preferably wire spoked, are applicable to wheel hubs of other types.

It is one of the objects of the invention to provide an improved and desirable quick detachable wheel adapted for replacement of ordinary wheels at a minimum expense.

A further object is to provide a relatively cheap and thoroughly dependable wire spoked wheel which may be marketed among individual automobile owners and by them easily installed.

Another object is to provide a simplified and efficient construction of hub parts whereby assembly thereof may be expeditiously accomplished and whereby a reliable and positive lock is effected, to hold the parts together.

Certain of the other objects and advantages will be noted hereinafter in connection with the following description of the accompanying drawings which illustrate a preferred embodiment of the invention, and in which—

Figure 1 is a central sectional view, showing, below the horizontal center line, a common wheel hub and assembly, and above the center line, the construction and assembly of the wheel of the present invention;

Fig. 2 is a side view, partially in section of the improved hub shell; and

Fig. 3 is an end view of one-half thereof.

In the particular embodiment of the invention illustrated, the wire spoked wheel is shown applied to the hub of a stock wheel used on Ford automobiles. It is to be noted, however, that the invention is capable of other embodiments, and is applicable for use with hubs of other types.

In Fig. 1 there is represented a steering spindle or axle 1 provided at its inner end with bearings 2 and at its outer end with bearings 3. A tubular metal hub 4 fits over the axle 1 and is mounted for rotation on and between the bearings mentioned. The hub 4 is retained by means of a nut 5 threaded on the outer end of the axle and acting, through elements 6 of the outer ball race and through balls 3, to hold the parts in assembled relation. A cap 7 is also threaded on the outer end of the hub 4 to complete the enclosure of the parts and exclude dust therefrom. The Ford hub 4 is also provided with an integral radial flange 8 adjacent its inner end and a separable complementary flange 9, between which flanges the inner ends of a series of wood spokes 10 are seated and clamped by bolts 11.

By the present invention the construction and assembly of the hub 4 and axle 1 remain unchanged and are utilized to support a quick detachable and preferably wire spoked wheel 12. For this purpose there is provided a tubular hub shell 13 adapted to telescopically fit over the hub 4 and its associated parts after the removal of the wood spokes 10 and their retaining flange 9. The shell 13, at its inner end, is provided with a radial flange 14 having symmetrically spaced apertures whereby bolts 15 with axially projecting heads 16 are employed, it may be through the original bolt holes in flange 8, to clamp in permanent relationship the shell and the hub 4, with the flanges 14 and 8 together. The shell 13 is further provided with a circumferentially continuous portion 17 intermediate its ends and spaced from flange 14 to bear upon an opposing portion of the hub 4. By this construction it will be noted that the shell 13 is firmly seated on the hub 4 and maintained in concentric relation with the latter and held against axial displacement. For a purpose to be described, the hub shell, at its outer end, which is elongated beyond the inner hub 4 and cap 7, is further provided with a series of right-hand screw threads 18 and, on a portion of reduced diameter, a series of left-hand threads 19.

The wire spoked wheel, as a removable unit, comprises a tire carrying rim 20 connected by spokes 21 with an outer tubular hub 22. The last-mentioned hub is adapted to telescope on the shell 13 and is provided, at its inner end, with an enlarged spoke flange 23 and a radial portion 24 apertured at intervals to receive the heads 16 of the bolts 15 when the hubs are assembled, thereby establishing a rotary lock between the wheel and inmost hub. Hub 22 is also provided with a conical bearing 25 to seat against a complementary bearing 26 on shell 13, and the outer hub is further piloted at 27 on the shell 13, towards its outer end.

To retain the outer hub and shell against axial displacement, while as well permitting quick detachability of the wheel, there is provided an interiorly threaded ring 28 to screw on the right-hand threads 18 of the shell and preferably having an angular portion 29 to abut or engage the flanged end 30 of the outer hub. In addition, a cap nut 31 is provided with interior left-hand threads to screw on the complementary threads 19 of the shell 13 and abut the outer end of the ring 28 whereby a wedging grip or clamp is effected between the right- and left-hand threaded elements and any tendency of the parts to loosen in service is effectively avoided. At the same time the cap nut and ring are readily removable by the use of common tools, whereupon the outer hub 22 and the wheel of which it constitutes a part is quickly detachable.

A particular manufacturing advantage is attained by the construction of ring shoulder 29 and end 30 of the outer hub as shown, since on account of the flat abutment of these parts, it is not essential to have exact concentricity of the threads 18 and 19 on the inner hub. That is to say, since the pressure between caps 31, ring 28 and hub 22 is largely in the direction of the axis of the hub, a considerable variation is permissible in the concentricity of the parts while still maintaining an effective and substantial lock.

If desired, however, the locking ring 28 might have the shoulder 29 beveled or tapered inwardly and the adjacent corner of the flange 30 correspondingly tapered whereby an additional wedging grip between these elements could be secured. In this case, it would be desirable to machine the threads on shell 13 more accurately and insure the concentric relationship of the parts in assembly.

It will be observed that the above-described construction permits substitution of wire spoked wheels for wood spoked wheels, or in effect the transformation of wood wheels into wire wheels, with a common utilization of certain parts, with a minimum attendant expense, and with comparative ease. Furthermore, the manufacture of the wire wheels, as above described, is facilitated in that the hub shell 13 requires machining only to provide a fit for bearing surfaces between which there is no relative rotation.

If it is desired to remove the hub 4 or to change the bearings between the latter and the axle 1, such operations may be accomplished without disturbing the mounting of the hub shell 13 or the outer hub 22. That is to say, while the wheel as a whole constitutes, in certain respects, a unit, still the assembly of the hub shell 13 with the inner hub 4 and axle 1 on the one hand, and with the outer hub 22 on the other hand, is independent and the detachability of the outer hub or inner hub may readily be accomplished without disturbing the relationship between the shell and the other.

Fig. 1, as described, shows an assembly on a front or steering axle. It is to be understood, however, that a substantially similar construction is present in the wheels of the rear or driving axle, though in the latter case, of course, the inner hub 4 is keyed or otherwise fixed to the axle to transmit the driving power. In both cases the quick detachable wheel, when applied, houses the hub of the wheel replaced and accordingly presents a finished and complete appearance. In both cases, also, the vertical center line or plane of the quick detachable wheel, when mounted, is preferably the same as the center plane of the wheel replaced. This is obtained by proper lacing of the wire wheel spokes, and insures a proper weight and strain distribution on the wheel, as well as correct disposition of the tires.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. The combination with a hub having a spoke flange at its inner end, and means to secure said hub on an axle, of a quick detachable wheel for said hub comprising a shell fitted over said hub and secured to said flange, and an outer hub fitted over said shell and interlocked with the latter against relative rotation.

2. The combination with a hub having a spoke flange at its inner end, and means to secure said hub on an axle, of a quick detachable wheel for said hub comprising a shell fitted over said hub and secured to said flange, and an outer hub fitted over said shell and interlocked with the latter against relative rotation, said shell and outer hub completely housing said first hub and its securing means.

3. The combination with a hub having a spoke flange at its inner end, and means to secure said hub on an axle, of a quick detachable wheel for said hub including a shell telescoping on said hub and having a circumferentially continuous portion intermediate its ends bearing on the exterior of said hub and having a flange at its inner end, means to secure together the flanges of said shell and said hub, an outer hub telescoping on said shell and having a portion bearing on the exterior of said shell intermediate the bearing portion and the flange of the latter and interlocking against relative rotation, and means at the outer end of said shell to co-operate with said outer hub for releasably securing the latter against axial displacement.

4. The combination with a hub having a spoke flange at its inner end, an axle, bearings intermediate said hub and axle, and means on said axle to secure said hub against axial displacement through the medium of said bearings, of a quick detachable wheel including a tubular shell telescoping on said hub and having a flange at its inner end to abut said spoke flange before mentioned, said shell also having a portion intermediate its ends and on the side of the vertical center plane of said wheel opposite to said flange bearing on the exterior of said hub, bolts connecting said flanges and having axially disposed heads projecting outwardly, an outer hub telescoping on said shell and interlocking with said bolt heads to prevent relative rotation and having a portion bearing on said shell adjacent the center plane of the wheel, and removable means at the outer end of said shell to hold said outer hub against axial displacement.

5. In a quick detachable wheel, in combination, a shell, an outer hub telescoping thereon, and means to secure said hub against axial displacement on said shell comprising two threaded elements screwing on said shell, one of said elements engaging said hub and the other engaging the one, said elements having reversely disposed threads whereby a tendency of one to unscrew is counteracted by the other.

6. In a quick detachable wheel, in combination, a shell, an outer hub telescoping thereon, and means to secure said hub against axial displacement on said shell comprising a threaded ring and a threaded nut screwing on said shell, said ring engaging said hub and said nut engaging said ring, said ring and nut having reversely disposed threads whereby a tendency of said ring to unscrew is counteracted by said nut.

7. In a quick detachable wheel, in combination, a shell, a hub telescoping thereon and interlocking therewith against relative rotation, a threaded ring screwing in one direction on said shell and against said hub, and a threaded cap nut screwing in the other direction on said shell and against said ring.

8. In a quick detachable wheel, in combination, a shell, an outer hub telescoping thereon and interlocking against relative rotation therewith, a threaded ring screwing on said shell and against said hub, and a threaded cap nut screwing on said shell and against said ring, said ring and cap nut having right- and left-hand threads respectively.

9. In a quick detachable wheel, in combination, a shell, a hub telescoping thereon, means to interlock said elements against relative rotation, and means to releasably secure said hub against axial displacement, said means comprising a series of right-hand threads and a series of left-hand threads on different diameter portions of said shell adjacent its outer end, a threaded ring screwing on the inner of said portions to engage said hub and a threaded cap nut screwing on the outer of said portions to engage said ring.

10. In combination, an axle, a wheel hub thereon, means on said axle to retain said hub against axial displacement, a tubular shell telescoping on said hub and having a circumferential portion bearing on the same intermediate its ends, removable means securing said shell against relative rotation and axial displacement on said hub, and a quick detachable wheel including an outer hub and rim, said outer hub telescoping on said shell and having axially spaced circumferential portions bearing on the same, means to lock said outer hub and shell against relative rotation, and removable means threaded on the outer end of said shell to hold said outer hub against axial displacement, said outer hub being removable independently of said shell and first hub, and said first hub being removable without separation of said shell from said outer hub.

11. The combination with a hub constructed for direct attachment thereto of wood spokes carrying a tire-supporting rim at their outer ends; of a substitute quick detachable wire spoked wheel including a shell telescoping on said hub and having a circumferentially continuous but axially restricted portion bearing on a medial exterior surface of said hub; means to secure said shell to the inner end of said hub and hold the parts against relative rotation and axial displacement; an outer hub, with wire spokes connected thereto and to a tire-supporting rim, telescoping on said shell and having a conical load-supporting portion bearing on a complementary exterior surface of said shell intermediate said before-mentioned bearing portion and the inner end of said shell; and means adjacent the outer ends of said outer hub and shell to hold them against relative axial displacement.

12. The combination with a hub having a radial flange at its inner end and an adjacent cylindrical surface adapted to receive the inner ends of wood spokes carrying a tire-supporting rim at their outer ends; of a substitute quick detachable wire spoked wheel including a shell telescoping on said hub and having a circumferentially continuous portion bearing on said cylindrical surface of said hub; means to secure said shell and hub against relative rotation and axial displacement; an outer hub, with wire spokes connected thereto and to a tire-supporting rim, telescoping on said shell and having a conical load-supporting portion bearing on a complementary exterior surface of said shell intermediate said circumferentially continuous bearing portion thereof and the inner end of said shell, but adjacent the former; and means adjacent the outer ends of said outer hub and shell to hold the same against relative axial displacement.

13. In a quick detachable wheel, in combination, an inner shell, an outer hub telescoping thereon and having an enlarged spoke-attaching portion at its outer end terminating in a wall projecting toward but spaced from said inner shell, said shell being of a dimension to project beyond said wall of said hub and having different diameter portions at its outer end provided with oppositely disposed screw threads, a ring having a portion to enter between said wall of said hub and said shell and screwing on the latter in one direction and having an angular portion to bear against the outer face of said wall of said hub to hold the latter against axial displacement, and a cap nut having threads to screw on the other threads of said hub in the other direction and having a wall to bear against the outer face of said ring.

14. In a quick detachable wheel, in combination, an inner shell, an outer hub telescoping thereon and having an enlarged spoke-attaching portion at its outer end terminating in a wall projecting at substantially right angles toward but spaced from said inner shell, said shell being of a dimension to project beyond said wall of said hub and having different diameter portions at its outer end provided with oppositely disposed screw threads, a ring having a portion to freely enter between said wall of said hub and said shell and screwing on the latter in one direction and having a substantially right-angled portion to bear against the outer face of said wall of said hub to hold the latter against axial displacement, and a cap nut having interior threads to screw on the other threads of said hub in the other direction and having a wall to bear against the outer face of said ring.

In testimony whereof I affix my signature, in the presence of two witnesses.

CHARLES S. ASH.

Witnesses:
J. R. WATSON,
H. E. VAN HORN.